United States Patent
Dahlquist et al.

[15] 3,684,365
[45] Aug. 15, 1972

[54] DISPLAY TUBE CAMERA SYSTEM ALLOWING AN OBSERVER AN UNOBSTRUCTED VIEW OF THE DISPLAY

[72] Inventors: John A. Dahlquist; Guy A. Marlor, both of Palo Alto, Calif.; Richard M. Whitehorn, Ann Arbor, Mich.

[73] Assignee: Varian Associates, Palo Alto, Calif.

[22] Filed: July 8, 1971

[21] Appl. No.: 160,939

Related U.S. Application Data

[63] Continuation of Ser. No. 804,559, March 5, 1969, abandoned.

[52] U.S. Cl. .................355/3, 95/11, 346/110, 353/69
[51] Int. Cl. .................................G03b 27/68
[58] Field of Search........346/107, 108, 110; 250/65, 250/66; 350/19, 29, 50, 52; 353/69, 70; 355/3

[56] References Cited

UNITED STATES PATENTS

| | | | |
|---|---|---|---|
| 3,508,822 | 4/1970 | Cornell et al. | 353/69 |
| 3,519,344 | 7/1970 | Clark et al. | 355/5 |
| 2,633,403 | 3/1953 | Spaulding | 346/110 |
| 2,166,440 | 7/1939 | Jones | 250/66 |
| 2,256,103 | 9/1941 | Reason | 353/69 |
| 3,383,993 | 5/1968 | Yeh | 355/3 |

OTHER PUBLICATIONS

"Instruments on the March" page 488, Instruments, Vol. 25

*Primary Examiner*—Samuel S. Matthews
*Assistant Examiner*—R. E. Adams

[57] ABSTRACT

A display camera for taking sequential exposures of objects appearing on the face of a cathode-ray tube is disclosed. The camera is secured to the cathode-ray tube and positioned such that a mirror in the camera reflects an optical image of the objects on the face of the cathode-ray tube to a camera plate. The optical axis of the mirror intersects the plane of the cathode-ray tube display at an oblique angle to permit an observer an unobstructed front view of the display. A wide angle lens is disposed on the optical axis of the mirror for focusing the display objects onto the camera plate. The wide angle lens is disposed with its optical axis substantially displaced from the optical axis of the mirror and with its optical axis substantially perpendicular to both the plane of the display object and the plane of the camera plate, as such optical axis may be reflected via the mirror, whereby distortion of the optical image at the camera plate is avoided.

1 Claim, 7 Drawing Figures

PATENTED AUG 15 1972 3,684,365
SHEET 1 OF 2
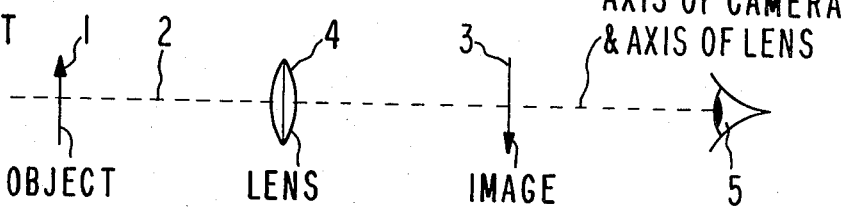
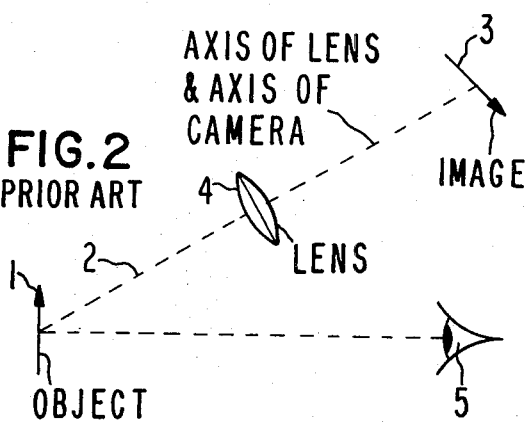
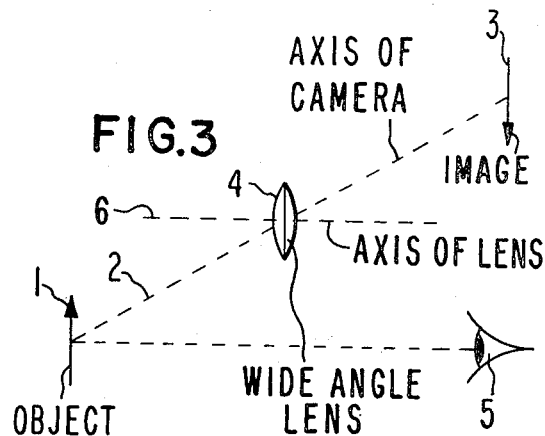
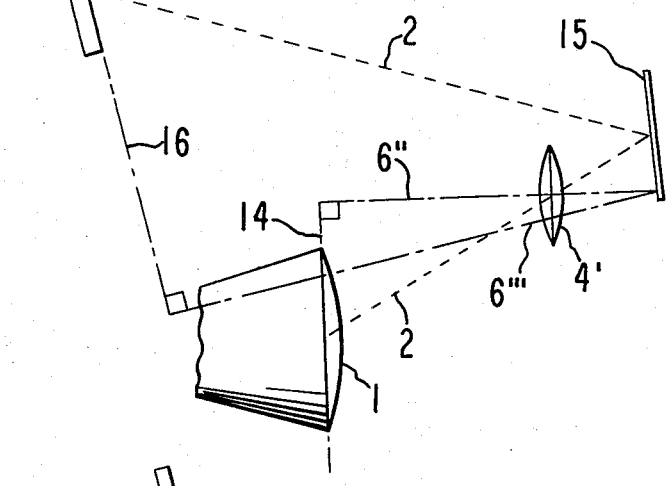
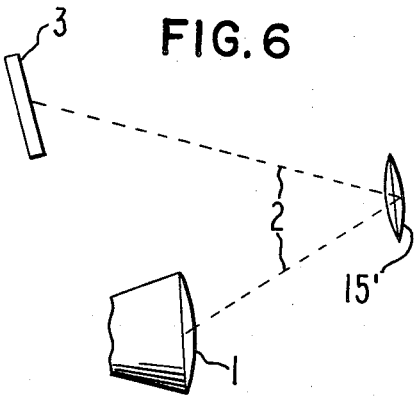
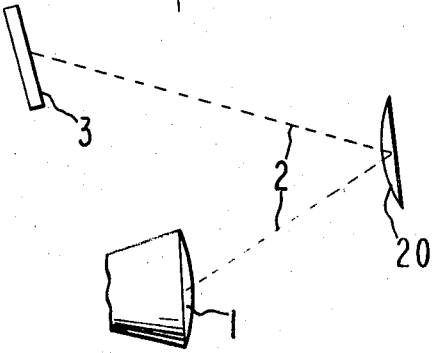
INVENTORS
JOHN A. DAHLQUIST
GUY A. MARLOR
RICHARD M. WHITEHORN
BY Leon F. Herbert
ATTORNEY 3,684,365

DISPLAY TUBE CAMERA SYSTEM ALLOWING AN OBSERVER AN UNOBSTRUCTED VIEW OF THE DISPLAY

DESCRIPTION OF THE PRIOR ART

This is a continuation of application Ser. No. 804,559, filed Feb. 5, 1969, now abandoned.

Heretofore, oscilloscope cameras have been proposed wherein the camera was disposed at an oblique angle to the display face of the oscilloscope to permit an observer to observe the oscilloscope face from a nearly frontal viewpoint. Such a system is disclosed in U.S. Pat. No. 2,633,403 issued Mar. 31, 1953. In this system, the camera lens had an optical axis in alinement with the optical axis of the camera system such that the axis of the lens was at an oblique angle to the plane of the display face of the oscilloscope. In such an arrangement, it is found that distortion is produced in the image as focused by the lens onto the image plate of the camera. It is desirable to provide a camera system which views the oscilloscope face from an oblique angle but which does not produce distortion in the image as focused upon the camera plate.

It is also known from the prior art that the overall length of the camera housing can be substantially reduced by employing a mirror in the optical system of the camera for folding the optical axis or otherwise bending the optical axis of the camera to reduce the overall length of the space required for the optical system. Such a camera employing a mirror is disclosed in U.S. Pat. No. 2,166,440 issued July 18, 1939.

SUMMARY OF THE PRESENT INVENTION

The principal object of the present invention is the provision of an improved display camera system allowing an observer an unobstructed front view of the display.

One feature of the present invention is the provision, in a display tube camera of a wide angle lens disposed on the optical axis of the camera system with the axis of the wide angle lens being substantially perpendicular to both the plane of the display object and the plane of the image plate of the camera, and at a substantial angle to the optical axis of the camera, such optical axis of the camera intersecting the plane of the display object at an oblique angle to allow an unobstructed observer's front view of the display object, whereby distortion in the image at the image plate of the camera is prevented.

Another feature of the present invention is the same as the preceding feature wherein the optical system of the camera includes a mirror for folding the optical axis of the camera to reduce the overall size of the camera.

Another feature of the present invention is the same as any one or more of the preceding features wherein the camera plate includes a photoconductive member onto which the image of the object is focused with means for positioning the charge retentive surface of a dielectric recording medium adjacent the photoconductor and means for impressing a potential across the photoconductor and the dielectric charge retentive surface for forming a charge image on the dielectric layer for subsequent development, whereby relatively inexpensive prints of the display object are obtainable.

Other features and advantages of the present invention will become apparent upon a perusal of the following specification taken in connection with the accompanying drawings wherein:

BRIEF DESCRIPTION OF THE DRAWINGS

FIG. 1 is a schematic line diagram depicting a prior art camera system.

FIG. 2 is a schematic line diagram of an alternative prior art camera system.

FIG. 3 is a schematic line diagram of a camera system employing features of the present invention.

FIG. 5 is a schematic line diagram of an alternative optical system.

FIG. 6 is a schematic line diagram of an alternative optical system, and

FIG. 7 is a schematic line diagram of an alternative optical system.

DESCRIPTION OF THE PREFERRED EMBODIMENTS

Figure 4:
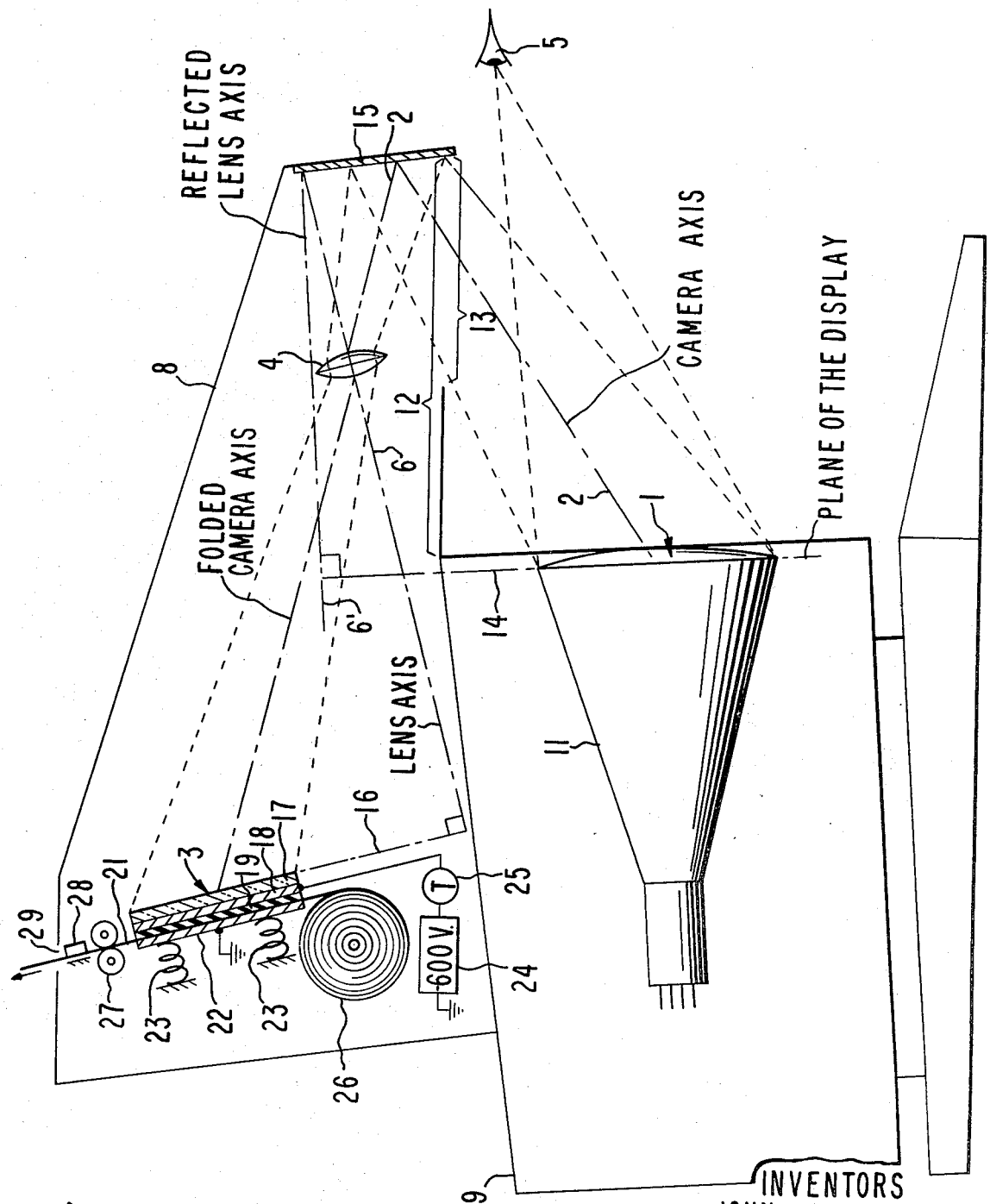
FIG. 4 is a schematic diagram, partly in section and partly in block diagram form, of a cathode-ray tube camera incorporating features of the present invention.

Referring now to FIG. 1, there is shown a typical prior art camera system for photographing display objects appearing on the face of an oscilloscope. In this prior art system, the plane of a display object 1 is disposed perpendicular to the axis 2 of the camera with the axis 2 of the camera passing through a lens 4 to a camera plate 3. The axis of the lens 4 is coincident with the axis 2 of the camera. This type of an optical system produces substantially no distortion in the image as projected onto the camera plate 3. However, this type of a camera obstructs a frontal view of the object 1 by an observer 5.

Referring now to FIG. 2, there is shown another prior art camera system wherein the observer 5 has a frontal view of the display object 1 and the camera views the object 1 from an oblique angle through lens 4 with the axis of the lens 4 and the axis 2 of the camera being coincident. The axis of lens 4 is also oblique to the camera plate 3. In this case, substantial distortion of the image on the camera plate 3 is obtained.

Referring now to FIG. 3, there is shown a camera system incorporating features of the present invention. More particularly, the system provides an unobstructed frontal view of the object 1 by an observer 5 and the lens 4 of the camera is disposed on the axis 2 of the camera, such axis 2 being at an oblique angle to the object plane 1. However, the axis 6 of the lens 4 is perpendicular to the plane of the object 1 and to the plane of the camera plate 3, such that substantially no distortion of the image at the camera plate 3 is obtained. This arrangement has the advantage of permitting an unobstructed front view of the cathode-ray object display 1 while permitting the camera to photograph the display without introducing distortion. It requires the use of a wide angle lens 4 but such lenses are commercially available. A typical example of such a wide angle lens is a Schneider ANGULON F:6.8–21 cm lens.

Referring now to FIG. 4, there is shown, in schematic line diagram form, a camera for photographing the display of a cathode-ray tube, such camera incorporating features of the present invention. The system includes a camera housing structure 8 which substantially encloses the structural elements of the camera. The camera housing 8 is affixed to a cabinet 9 which contains the cathode-ray tube 11. The display face 1 of the cathode-ray tube 11 is visible to an observer 5 from the front of the cabinet 9. The camera housing 8 includes a portion 12 which overhangs the front face of the cabinet 9 and which includes an opening 13 therein to permit a view of the display object on the face 1 of the cathode-ray tube 11.

Although the display face 1 of the cathode-ray tube 11 is curved, having a relatively large radius of curvature, it will be assumed herein that the display object 1 to be viewed and photographed lies within a plane containing the chords of the spherical segment defined by the marginal edges of the display face 1. This plane is indicated by line 14 of FIG. 4.

The camera includes a camera optical system having a camera axis 2 which intersects the plane of the display 14 at an oblique angle such as to permit an unobstructed view of the display face 1 by the observer 5. The camera optical system includes a mirror 15 carried from the front face of the camera housing 8. The mirror 15 is inclined at such an angle relative to the display plane 14 such that the display object 1 is reflected by the mirror 15 through lens 4 onto the camera plate 3, thereby defining the camera axis 2.

The wide angle lens 4 is disposed on the camera axis 2 with the axis 6 of the lens 4 being disposed perpendicular to a plane 16 containing the image plate 3. The lens axis, as reflected by the mirror 15 and indicated by the numeral 6', is also perpendicular to the plane 14 of the display. In this manner, distortion of the display image focused by the lens 4 onto the image plate 3 is substantially reduced. Lens 4, as previously described, is preferably a wide angle lens such as a Schneider AN-GULON F:6.8–21 cm lens. The optical system of the camera of FIG. 4 is substantially the same as the optical system of FIG. 3 except that the camera axis 2 is folded by means of the mirror 15, thereby permitting use of a smaller sized camera housing 8 and allowing the camera to extend away from the observer 5.

Although the wide angle lens 4 has been shown in FIG. 4 as disposed between the camera plate 3 and the mirror 15, this is not a requirement; for example, the wide angle lens 4 may be disposed between the display object 1 and the mirror 15 as shown in FIG. 5 at 4'. In such a case, the lens axis 6'' is also perpendicular to the plane 14 of the display object 1 and the reflected lens axis 6''' is perpendicular to the plane 16 of the camera plate 3.

As an alternative to the use of a separate wide angle lens 4' and mirror 15 the remote side of the lens 4' may be coated with a reflective material to form the mirror 15' such that the mirror 15 and the lens 4' are combined into a single element as shown in FIG. 6. In this latter case, the mirror would be curved but this will not adversely affect the properties of the optical system of the camera.

In still another alternative embodiment, the wide angle lens 4 and mirror 15 may be completely replaced by a wide angle mirror indicated at 20 as shown in FIG. 7, for both folding the axis of the camera and for focusing the display image upon the camera plate 3.

The camera plate 3, in a preferred embodiment of the present invention, is a camera plate of an electrophotographic camera. More specifically, as shown in FIG. 4, the camera plate 3 includes an optically transparent substrate member 17 as of glass plate. An optically transparent conductive electrode layer 18 is deposited upon the plate 17. A photoconductive member 19 is deposited over the transparent conductive electrode 18. An electrographic recording web 21 is caused to be positioned with its dielectric charge retentive surface of the recording web 21 disposed adjacent the photoconductive member 19. A conductive backing electrode 22, which is preferably spring-biased via springs 23, makes electrical contact with a conductive backing on the dielectric layer of the recording web 21. The backing electrode presses the charge retentive surface of the recording web 21 into nominal contact with the surface of the photoconductor 19. The backing plate 22 is preferably operated at ground potential and a source 24 of negative potential, as of −600 volts, is connected to the conductive transparent electrode 18 via a timing switch 25. A charge image of the display object is produced on the charge retentive surface of the recording web 21 by applying the potential from source 24 across the recording web 21 for the proper exposure time via timing switch 25. Upon exposure, the web 21 is drawn from a supply roll 26 via drive rollers 27 passed an inking station 28 such that positively charged toner particles are attracted from the channel 28 to the negative charge image on the recording web 21. The toner particles may be suspended in air or in a dielectric liquid. The toner particles develop the charge image pattern on the recording web 21 and the developed exposures exit from the camera housing via opening 29 to form permanent recordings of the display images on the display tube 11.

As an alternative to the electrophotographic camera shown in FIG. 4, other conventional cameras may be employed which utilize photosensitive emulsions on a web of material; for example, one electrophotographic type of camera would employ a photoconductive emulsion on a paper web instead of the use of a separate photoconductive plate member 19. The charge image patterns to be developed would then be produced on the photoconductive emulsion and developed thereon. Alternatively, conventional photosensitive emulsions may be employed and developed in the more conventional manner.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

We claim:

1. In an electrophotographic camera for recording a CRT display onto a recording medium while simultaneously permitting frontal viewing of the CRT display along a viewing axis perpendicular to the CRT display, the combination comprising:

an electrophotographic recording apparatus with a photoconductive plate for converting the CRT display into a charge image on the recording medium;

a mirror means for folding the optical axis of the camera by reflecting the CRT display onto the photoconductive plate, the mirror mounted in offset relation to the frontal view of the CRT display to prevent obstruction of the viewing axis perpendicular to the CRT display, the offset relation causing the axis of the camera to intersect the axis of the CRT display at an angle substantially displaced from the perpendicular, the mirror means located outside the periphery of the frontal projection of the CRT display perpendicular to the CRT display; and a wide angle lens for focusing the CRT display onto the plane of the photoconductive plate and mounted along the axis of the camera but having an optical axis substantially angularly displaced from the axis of the camera, the optical axis of the lense being perpendicular to the plane of the photoconductive plate and also perpendicular to the plane of the CRT display through the folding of the optical axis of the camera to eliminate distortion by foreshortening.

* * * * *